United States Patent
Bhowmik et al.

(10) Patent No.: US 9,334,373 B2
(45) Date of Patent: May 10, 2016

(54) FIRE RETARDANT MATERIALS AND DEVICES INCLUDING SAME

(71) Applicants: The Board of Regents of the Nevada System of Higher Education on Behalf of the University of Nevada, Las Vegas, NV (US); InnoSense LLC, Torrance, CA (US)

(72) Inventors: Pradip K. Bhowmik, Henderson, NV (US); Kisholoy Goswami, Redondo Beach, CA (US); Maksudul M. Alam, Glendora, CA (US); Haesook Han, Henderson, NV (US)

(73) Assignees: THE BOARD OF REGENTS OF THE NEVADA SYSTEM OF HIGHER EDUCATION ON BEHALF OF THE UNIVERSITY OF NEVADA, LAS VEGAS, Las Vegas, NV (US); INNOSENSE LLC, Torrance, CA (US)

( * ) Notice: Subject to any disclaimer, the term of this patent is extended or adjusted under 35 U.S.C. 154(b) by 0 days.

(21) Appl. No.: 14/577,706

(22) Filed: Dec. 19, 2014

(65) Prior Publication Data

US 2016/0060401 A1  Mar. 3, 2016

Related U.S. Application Data

(60) Provisional application No. 62/043,851, filed on Aug. 29, 2014.

(51) Int. Cl.
  *C08G 79/02* (2006.01)
  *C08G 79/04* (2006.01)

(52) U.S. Cl.
  CPC ..................... *C08G 79/04* (2013.01)

(58) Field of Classification Search
  CPC ........................ H01L 51/0067; H01L 51/0072
  USPC .................................................... 528/53, 186
  See application file for complete search history.

(56) References Cited

U.S. PATENT DOCUMENTS

2006/0090777 A1 * 5/2006 Hecht ................ C11D 17/0013
                                                            134/42

FOREIGN PATENT DOCUMENTS

JP             06212067         *  8/1994   ............. C08L 85/02

* cited by examiner

*Primary Examiner* — Shane Fang
(74) *Attorney, Agent, or Firm* — Michael Best & Friedrich LLP

(57) ABSTRACT

This document provides fire retardant materials, including polymers that include pyridinium salt moieties, or a combination thereof, and phosphine oxide moieties. In some cases, fire retardant polymers provided herein have the following structure:

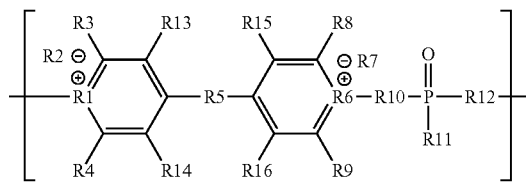

where R1 and R6 are each selected consisting of N, wherein R2 and R7 are each negatively charged counterions, where R3, R4, R8, R9, R11, R13, R14, R15, and R16 are each H or a group including one or more carbon molecules, and where R5, R10, and R12 are each groups including one or more carbon molecules.

23 Claims, 6 Drawing Sheets

FIRE RETARDANT MATERIALS AND DEVICES INCLUDING SAME

CROSS-REFERENCE TO RELATED APPLICATIONS

This application claims the benefit of U.S. Provisional Application Ser. No. 62/043,851, filed Aug. 29, 2014. The disclosure of the prior applications is considered part of (and is incorporated by reference in) the disclosure of this application.

STATEMENT AS TO FEDERALLY SPONSORED RESEARCH

This invention was made with government support under IIP0740289 awarded by National Science Foundation. The government has certain rights in the invention.

TECHNICAL FIELD

This document relates to fire retardant materials and devices including fire retardant materials. In some cases, a fire retardant material provided herein can include poly(pyridinium salt)s including phosphine oxide.

BACKGROUND

Polymers are commonly used in various products due to their tunable mechanical properties and ease of processing. Fire retardant polymers are polymers that are resistant to degradation at high temperatures. There is need for fire-resistant polymers in a variety of fields, including the construction of small, enclosed spaces such as skyscrapers, boats, and airplane cabins. In tight spaces, the ability to escape in the event of a fire is compromised, increasing fire risk. Fire-safe polymers also find application as adhesives in aerospace materials, insulation for electronics, and in military materials such as canvas tenting. Common polymers, however, can be highly combustible and can produce toxic gases and smoke during combustion. One common way to make polymers more resistant to combustion is to include flame retardant additives in a polymer. Flame retardant additives such as polychlorinated biphenyls and brominated flame retardants, however, can pose certain health concerns.

SUMMARY

Fire retardant polymer provided herein can include pyridinium salt moieties, and a combination thereof, and phosphine oxide moieties. In some cases, a fire retardant polymer provided herein can include repeating units each including at least one pyridinium salt and/or and at least one phosphine oxide moiety. In some cases, a fire retardant polymer provided herein can be a random copolymer of pyridinium salt moieties and phosphine oxide moieties. In some cases, a fire retardant polymer provided herein is substantially free of halogens.

In some cases, a fire retardant polymer provided herein can be inherently fire retardant. In some cases, fire retardant polymers provided herein have the following structure:

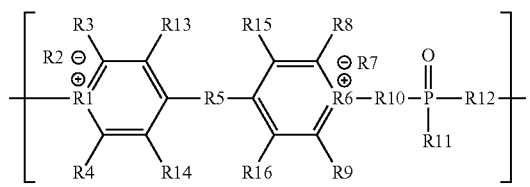

where R1 and R6 are each selected consisting of N, wherein R2 and R7 are each negatively charged counterions, where R3, R4, R8, R9, R11, R13, R14, R15, and R16 are each H or a group including one or more carbon molecules, and where R5, R10, and R12 are each groups including one or more carbon molecules. In some cases, at least one of R3, R4, R8, R9, R13, R14, R15, and R16 includes a phenyl group. In some cases, at least one of R10, R11, and R12 includes a phenyl group. In some cases, R3, R4, R5, R8, R9, R10, R11, and R12 each include a phenyl group. In some cases, R3, R4, R5, R8, R9, R10, R11, and R12 each consist of a phenyl group.

Fire retardant polymers provided herein can include any suitable phosphine oxide moiety. Phosphine oxide moieties in fire retardant polymers provided herein can, in some cases, include at least one phenyl group. In some cases, the phosphine oxide moieties can include at least two phenyl groups. In some cases, the phosphine oxide moieties can include at least three phenyl groups. In some cases, the phosphine oxide moieties can include at least one amine substituted phenyl group. In some cases, the phosphine oxide moieties comprise at least one trifluoromethyl substituted phenyl group. In some cases, the phosphine oxide moieties can include triphenyl phosphine. Other suitable phosphine oxide moieties are discussed below.

Fire retardant polymers provided herein can include any suitable pyridinium salt moiety. Pyridinium salt moieties in fire retardant polymers provided herein can, in some cases, include one or more phenyl groups. In some cases, pyridinium salt moieties in fire retardant polymers provided herein can include at least two pyridinium salt groups. In some cases, pyridinium salt moieties in fire retardant polymers provided herein can include at least two pyridinium salt groups bonded together via one or more phenyl groups. In some cases, pyridinium salt moieties in fire retardant polymers provided herein can include at least two phenyl groups. Other suitable pyridinium salt moieties are discussed below.

Pyridinium salt moieties in fire retardant polymers provided herein can include any suitable negatively charge ion. In some cases, pyridinium salt moieties used in fire retardant polymers provided herein can be selected from a group made up of the following counterions as shown in FIG. 1:

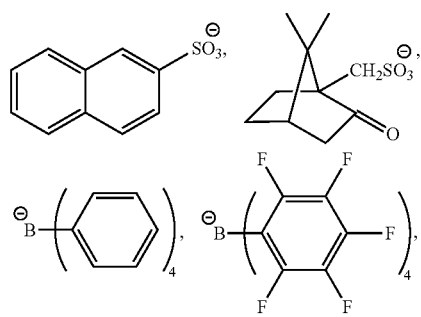

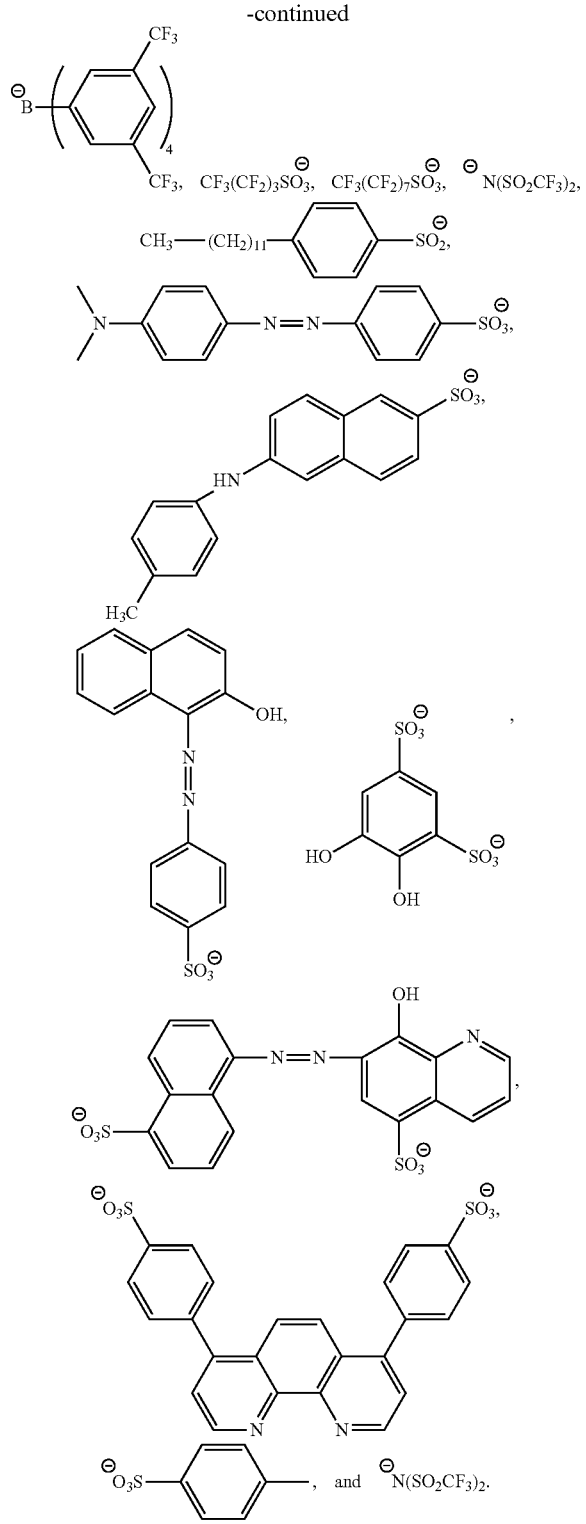

FIG. 1. Chemical structural variations, Y1⁻-Y15⁻, of tosylate counterion, Y⁻.

Fire retardant polymers provided herein can be used in any suitable product. In some cases, fire retardant polymer provided herein can be used in a building (e.g., a skyscraper, an apartment building, a tent, etc.) or a vehicle (e.g., a car, a military transport, an airplane, a spacecraft, etc.). In some cases, fire retardant polymers provided herein can be used as insulation for electronic equipment. In some cases, fire retardant polymer provided herein can be used as a membrane. In some cases, multiple nanoscale layers of differently charged polymer described herein can be used to make a membrane.

Fire retardant polymers provided herein can have one or more of the following advantages. In some cases, fire retardant polymers provided herein can be relatively inexpensive to produce and/or process. In some cases, fire retardant polymers provided herein can be mass produced. In some cases, fire retardant polymers provided herein can be processable with common organic solvents. In some cases, fire retardant polymers provided herein can have good film-forming properties. In some cases, fire retardant polymers provided herein can having high char yields and/or low flammability.

The details of one or more embodiments are set forth in the accompanying description below. Other features and advantages will be apparent from the description, drawings, and the claims.

DETAILED DESCRIPTION

Fire retardant polymers provided herein can be used in any suitable product. In some cases, polymers provided herein can be a structural component, an adhesive, and/or a lubricant. In some cases, polymers provided herein can be applied to an object, such as a structural component, in order to improve the fire resistant properties of the object. Suitable structural components including polymers provided herein include structural components of buildings and/or vehicles, such as windows, wooden beams, and dry wall. In some cases, polymers provided herein can be included in medical devices. In some cases, polymers provided herein can be used to insulate electrical components (e.g. wire) or equipment. Polymers provided herein can have fire retardant properties. In some cases, polymers provided herein do not produce toxic gasses when combusted. Polymers provided herein can be substantially free of bromine, chlorine, and/or halogens, which can produce harmful gasses if present in a combusted polymer.

In some cases, polymers provided herein can be formed using a layer-by-layer deposition (LbL) technique. The LbL technique is a highly controlled and broad-ranging method for creating multi-layered, uniform nano-architectures from two oppositely charged polymers. The poly(pyridinium salt)s are positively charged polymers, they are appropriate partners to build up nanoscale layers can be built up with precise control simply by varying the nature of negatively charged polymers. There are many negatively charged polymers both synthetic type (man-made), e.g., polystyrene sulfonates, and natural biopolymers, e.g. DNA. During LbL deposition, counterions can be washed away from positively and negatively charged polymers. Thickness, surface charge, and composition can be controlled through changing the nature of anionic polymers, the dip/wash cycles and the reaction conditions. Additionally, various morphologies can be achieved by changing the architectures of the underlying the substrate templates. In some cases, an LbL deposited polymer provided herein can be used as a membrane. In some cases, an LbL polymer membrane provided herein can be used for drug delivery, gene transfection, electrical stimulation for neural stem cells, or tissue engineering. In some cases, a biosensor can include an LbL polymer membrane provided herein.

Figure 1:
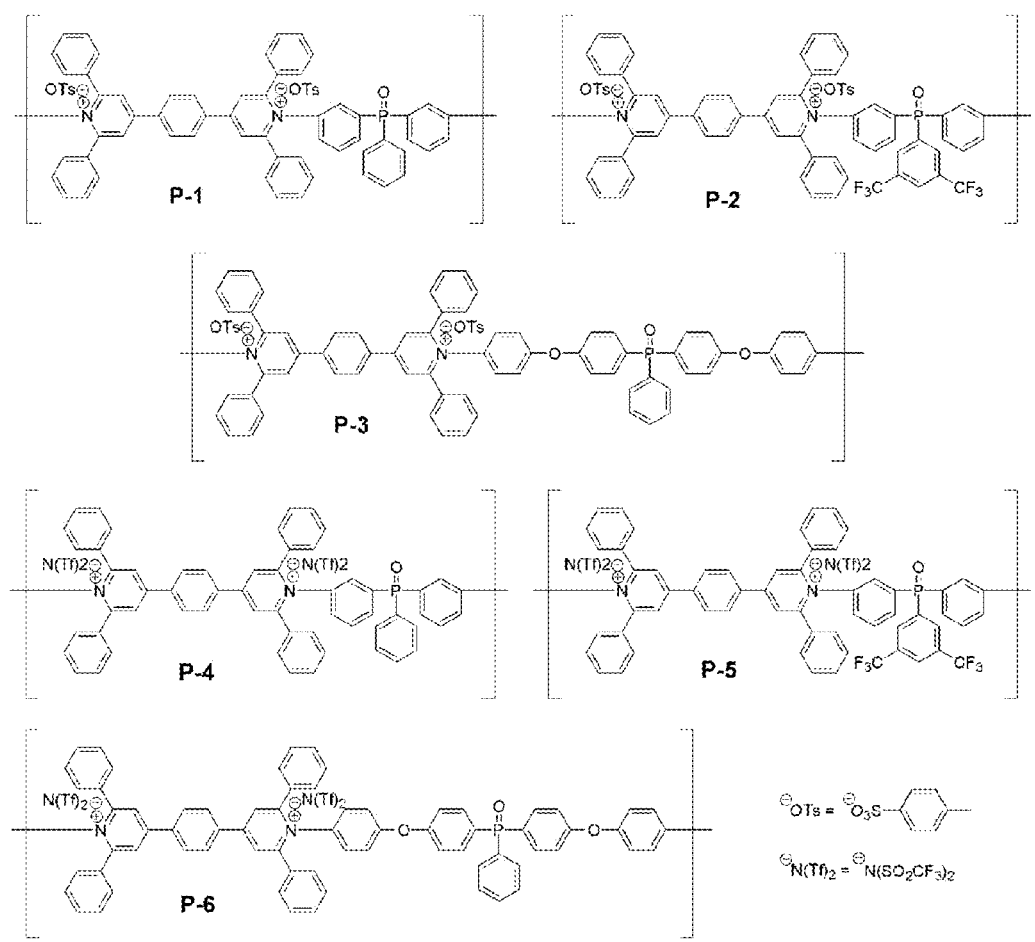
FIG. 1 depicts the chemical structures of various embodiments of fire retardant polymers provided herein.

Fire retardant polymer provided herein can include pyridinium salt moieties, pyrylium salt moieties, or a combination thereof, and phosphine oxide moieties. FIG. 1 depicts the chemical structures of various embodiments of fire retardant polymers including pyridinium salt moieties provided herein. As shown in FIG. 1, exemplary polymer P-1 includes a repeating unit including a pyridinium salt moiety including bis(2,6-diphenylpyridinium) ditosylate and a phosphine oxide moiety including triphenyl phosphine oxide. As shown, P-1 includes tosylate counterions (OTs$^-$). P-2 is similar to P1, but includes a trifluoromethyl substituted triphenyl phosphine oxide moiety. P-3 is similar to P-1, but includes oxyphenyl groups between each bis(2,6-diphenylpyridinium) ditosylate and each triphenyl phosphine oxide. P-4 is similar to P-1, but includes N(Tf)$_2^-$ counterions instead of tosylate counterions. P-5 is similar to P-2, but includes N(Tf)$_2^-$ counterions instead of tosylate counterions. P-6 is similar to P-3, but includes N(Tf)$_2^-$ counterions instead of tosylate counterions.

Figure 2:
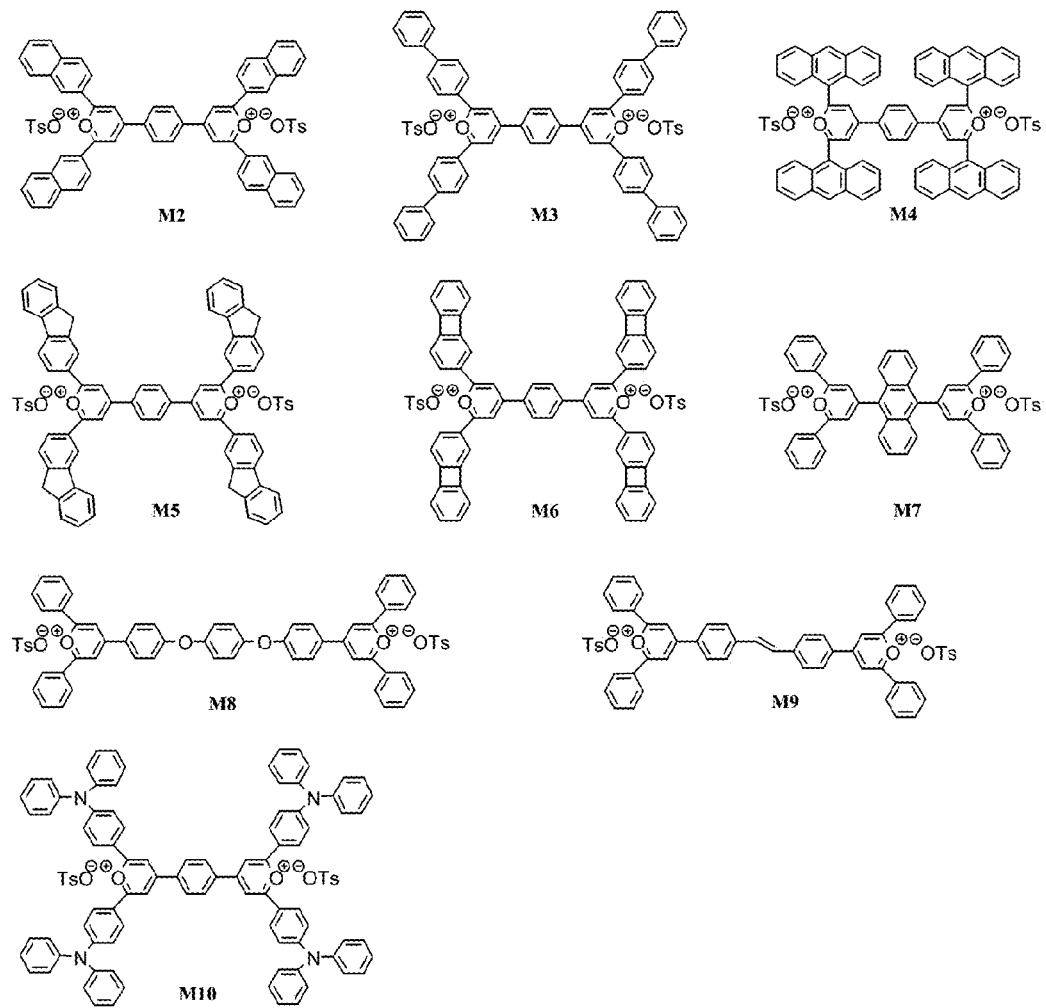
FIG. 2 depicts chemical structural variations, M2-M10, which can be included in polymers provided herein.

FIG. 2 depicts pyrylium salt chemical structural variations, M2-M10, which can be substituted for bis(2,6-diphenylpyridinium) ditosylate in polymers P-1 and P-4 depicted in FIG. 1. M2-M10 are pyrylium salts having varying chemical architectures from which on polymerization produces poly(pyridinium salt)s moieties that have structures identical to that shown in M2-M10 in FIG. 2, but having one or more oxygen atoms replaced with nitrogen atoms. Each of M2-M10 can be used in polymers provided herein.

Figure 3:
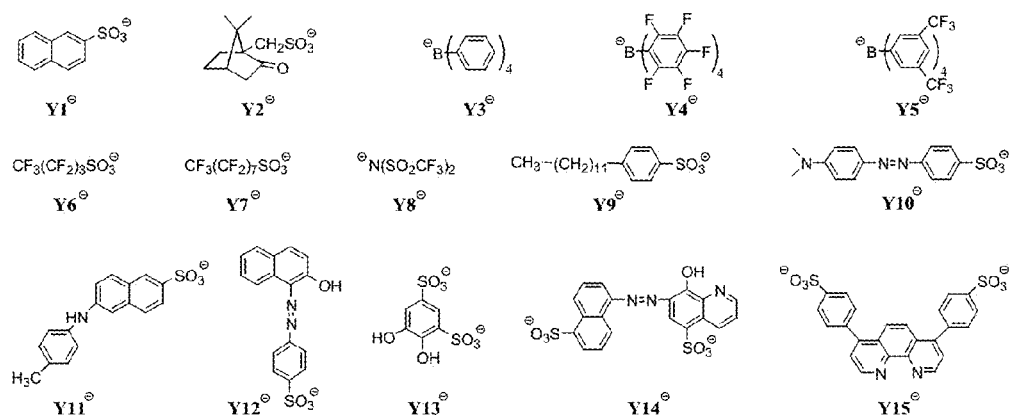
FIG. 3 depicts chemical structural variations, Y1-Y15, which can be included in polymers provided herein.

FIG. 3 depicts chemical structural variations, Y1-Y15, which can be used as counterions in polymers provided herein. For example, Y1-Y15 can be substituted for the tosylate counterions in the polymers P-1, P-2, or P-3 depicted in FIG. 1. In some cases, as shown, counterions provided herein can be aliphatic. In some cases, as shown, counterions provided herein can be aromatic. In some cases, as shown, counterions provided herein can be negatively charged. In some cases, as shown, counterions provided herein can be doubly negatively charged.

Figure 4:
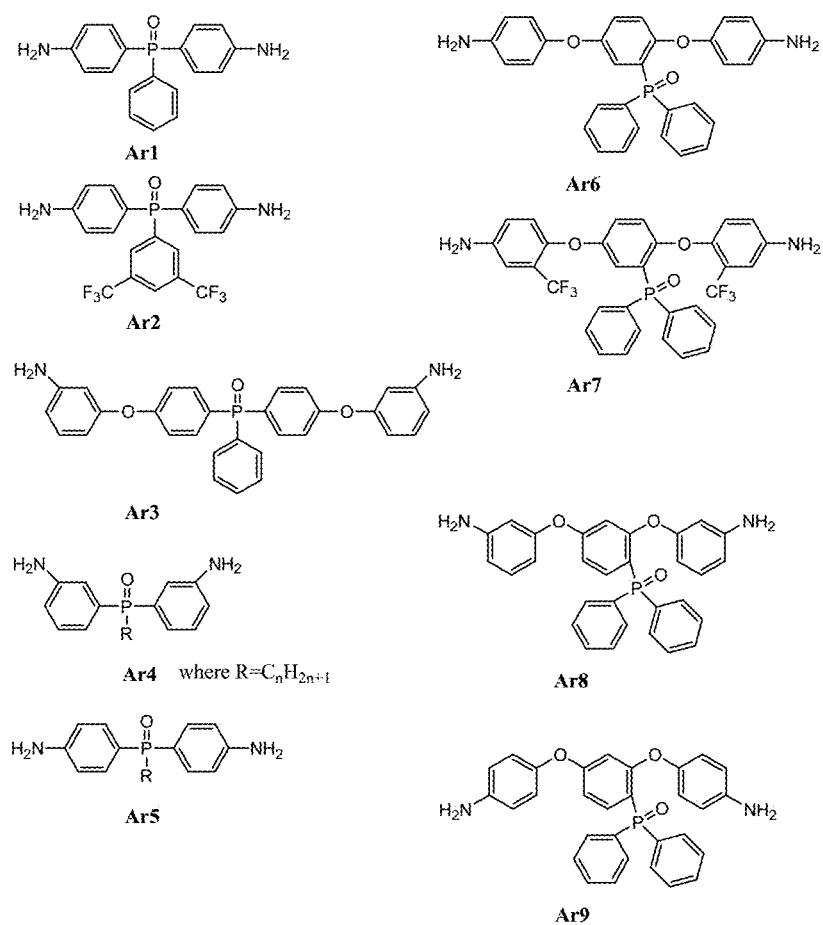
FIG. 4 depicts chemical structural variations, Ar1-Ar9, which can be included in polymers provided herein.

FIG. 4 depicts chemical structural variations, Ar1-Ar9 which can be used as the phosphine oxide moieties in polymers provided herein. Ar1-Ar9 are examples of phosphine oxide aromatic diamine compounds.

Figure 5:
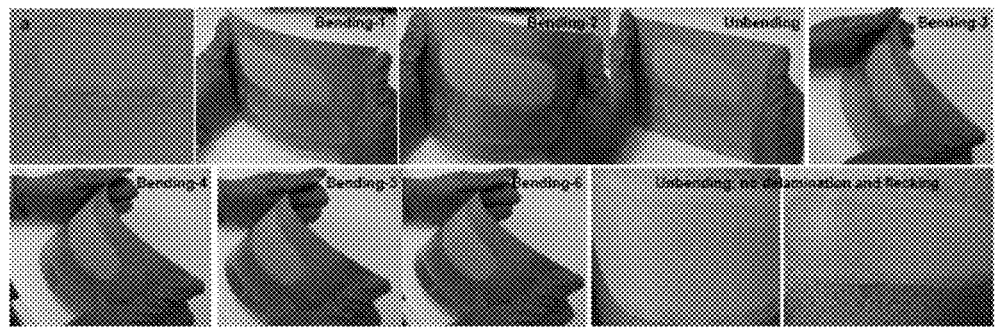
FIG. 5 depicts photographs of large-area thin films of polymer P-1 from FIG. 1 on tin substrates being bent and unbent.

FIG. 5 depicts photographs of large-area thin films of polymer P-1 from FIG. 1 on tin substrates being bent and unbent. The polymer was applied by spray coating polymer P-1 from a methanol solution. As shown, the resulting composite can be bent without delaminating, indicating that P-1 is flexible and durable. To understand adhesion, delamination, mechanical and tensile strength of the Ionic polymers, large area thin films of the ionic polymers on metal substrates were prepared by spray coating. FIG. 5 shows the large-area thin films of ionic polymer P-1 on tin metal substrates (without any surface treatment of the metal substrate) prepared by spray coating from methanol solutions. The thin films retained their quality even after bending-unbending the metal substrates at different angles. They also retained the quality of the thin films over a long period of time. No delamination and flecking of the thin films were observed while bending-unbending the metal substrates (FIG. 5). Similar properties were also observed for ionic polymers P-2 to P-6. These results suggest that they show excellent adhesion to metal substrates, high mechanical and tensile strength, and have excellent application potential as coating and structural component materials for automobiles, aircrafts, engines, and power/propulsion systems.

Figure 6:
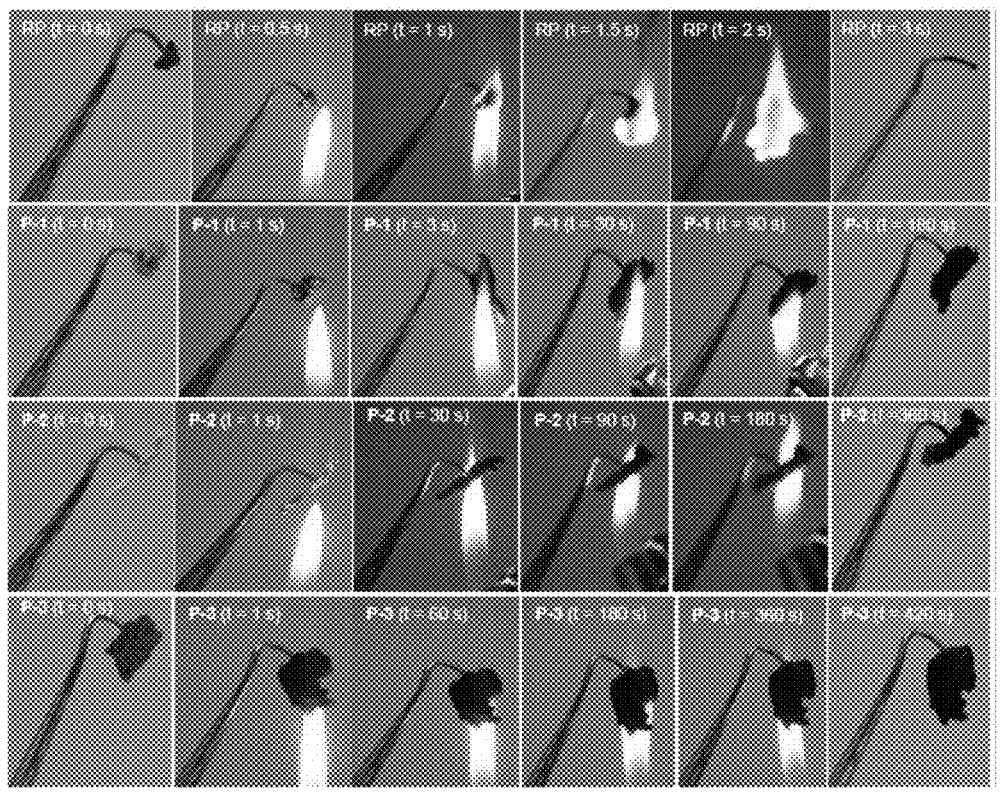
FIG. 6 depicts photographs taken during a direct flaming/combustion of a reference polymer and polymers P-1, P-2, and P-3 of FIG. 1.

FIG. 6 depicts photographs taken during a direct flaming/combustion of a reference polymer and polymers P-1, P-2, and P-3 of FIG. 1. As shown, the reference polymer completely combusts, while P-1, P-2, and P-3 do not ignite, but merely char. The melting and dripping were also recorded in this test. We used this consistent and repeatable method to evaluate fire retardant properties of the polymer samples including reference polymer. Rapid responses to flame ignition (within a second) and complete burning within 2-3 seconds were observed for the reference polythiophene (FIG. 6). In the case of ionic polymers, no flaming, flame propagation, melting and dripping were observed by direct flaming with a propane torch for over 5 minutes although deformation and color change from yellow to dark due to char formation were observed (FIG. 6). These results indicate that the phenyl phosphine oxide-containing ionic polymers (P-1 to P-6) in this invention exhibit excellent fire resistant and retardant properties.

Figure 7:
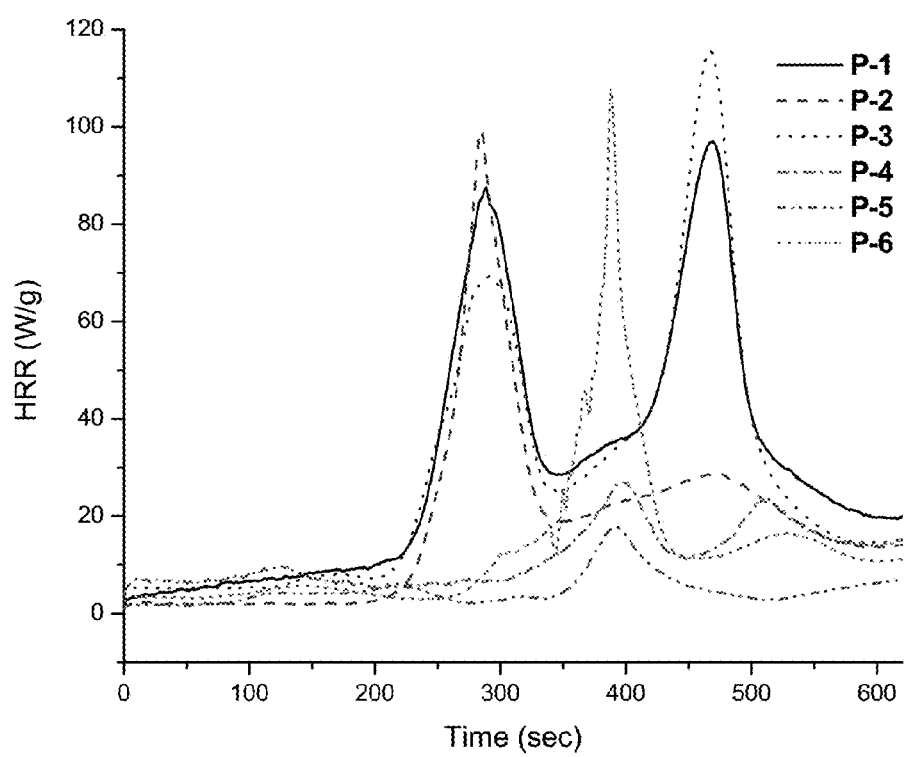
FIG. 7 depicts the HRR (W/g) of samples of polymers P-2, P-3, P-4, P-5, and P-6 from FIG. 1 over time.

FIG. 7 depicts the HRR (W/g) of samples of polymers P-2, P-3, P-4, P-5, and P-6 from FIG. 1 over time. Cone calorimetry is able to provide useful information about the combustion of the polymers and is the most effective for the laboratory evaluation of the flame retardant properties of polymers. This technique measures heat release rate (HRR) and peak heat release rate (PHRR); both are considered the most significant parameters. A highly flame-retardant polymer shows a low PHRR value. Total heat released (THR) is another important parameter, which represent the sum of heat released until the flame is extinguished.

What is claimed is:
1. A fire retardant polymer comprising:
   a. at least one pyridinium salt moiety; and
   b. at least one phosphine oxide moiety.
2. The polymer of claim 1, wherein the polymer has the following structure:

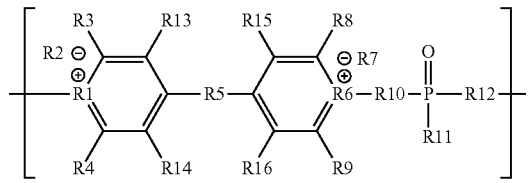

wherein R1 and R6 are each selected consisting of N;
wherein R2 and R7 are each negatively charged counterions;
wherein R3, R4, R8, R9, R11, R13, R14, R15, and R16 are each selected from the group consisting of H and groups comprising one or more carbon molecules; and
wherein R5, R10, and R12 are any group comprising one or more carbon molecules.
3. The polymer of claim 2, wherein at least one of R3, R4, R8, R9, R13, R14, R15, and R16 comprises a phenyl group.

4. The polymer of claim 2, wherein at least one of R10, R11, and R12 comprises a phenyl group.

5. The polymer of claim 2, wherein R3, R4, R5, R8, R9, R10, R11, and R12 each comprise a phenyl group.

6. The polymer of claim 2, wherein R3, R4, R5, R8, R9, R10, R11, and R12 each consist of a phenyl group.

7. The polymer of claim 1, wherein said phosphine oxide moiety comprises at least one phenyl group.

8. The polymer of claim 1, wherein said phosphine oxide moiety comprises at least two phenyl groups.

9. The polymer of claim 1, wherein said phosphine oxide moiety comprises at least three phenyl groups.

10. The polymer of claim 1, wherein said phosphine oxide moiety comprises at least one amine substituted phenyl group.

11. The polymer of claim 1, wherein said phosphine oxide moiety comprises at least one trifluoromethyl substituted phenyl group.

12. The polymer of claim 1, wherein said phosphine oxide moiety comprises triphenyl phosphine.

13. The polymer of claim 1, wherein said pyridinium salt moiety comprises at least two pyridinium salt groups.

14. The polymer of claim 13, wherein said at least two pyridinium salt groups are bonded together via one or more phenyl groups.

15. The polymer of claim 1, wherein said pyridinium salt moiety comprises at least one phenyl group.

16. The polymer of claim 15, wherein said pyridinium salt moiety comprises at least two phenyl groups.

17. The polymer of claim 1, wherein said pyridinium salt moiety comprises a charged ion selected from the group consisting of:

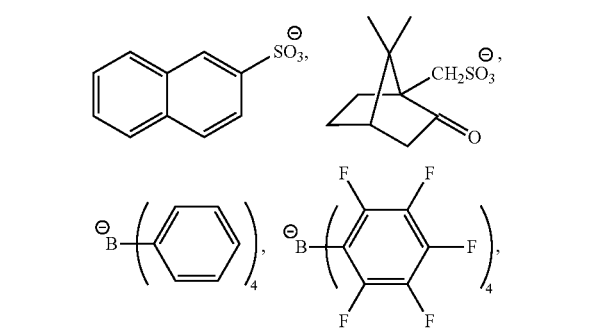

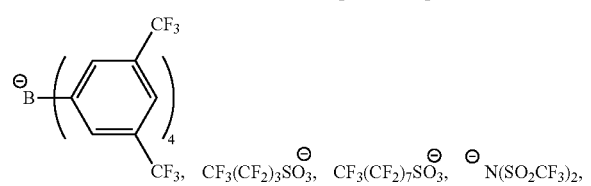

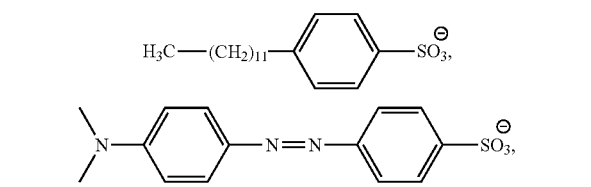

-continued

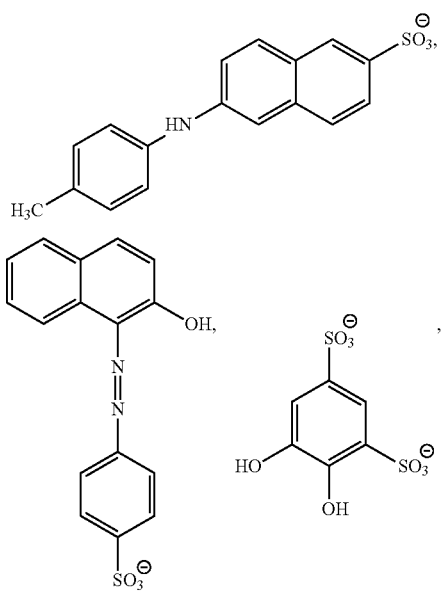

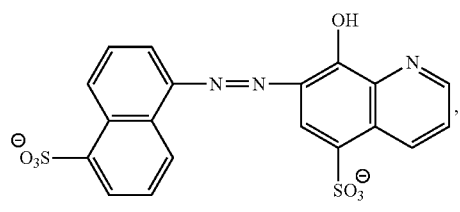

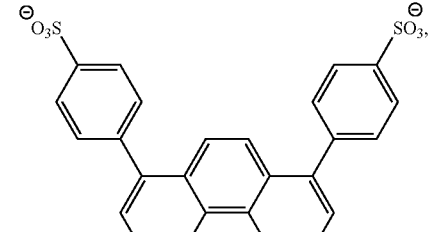

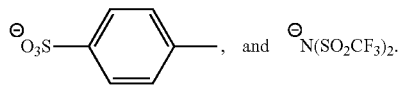

18. The polymer of claim 2, wherein R2 and R7 are each independently selected from the group consisting of:

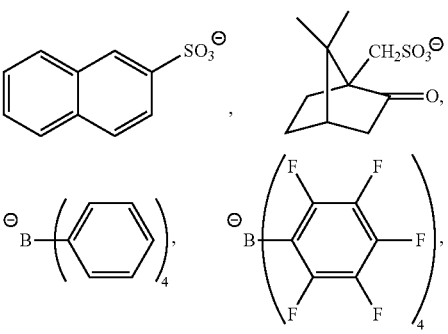

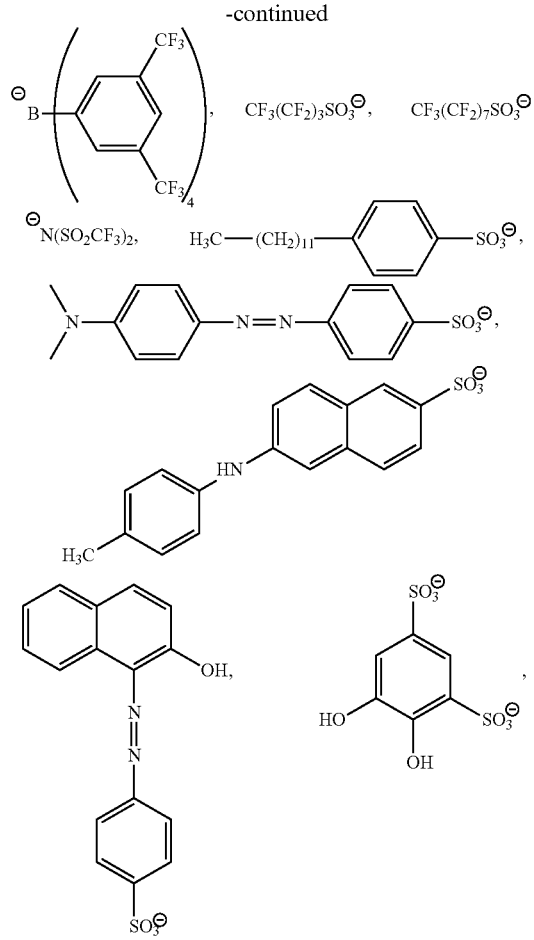

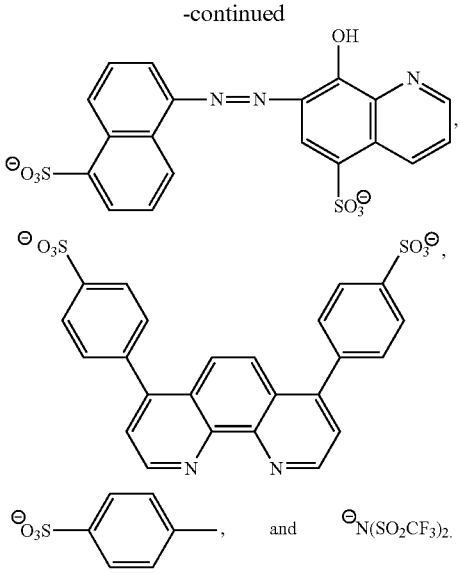

19. The polymer of claim 1, wherein the polymer is a random copolymer.

20. The polymer of claim 1, wherein the polymer comprises repeating units each comprising at least one pyridinium salt moiety and at least one phosphine oxide moiety.

21. A construction material comprising the polymer of claim 1.

22. An insulation comprising the polymer of claim 1.

23. A medical device comprising the polymer of claim 1.

* * * * *